(12) United States Patent
Bandoh et al.

(10) Patent No.: US 7,048,321 B2
(45) Date of Patent: May 23, 2006

(54) HIGH-VOLTAGE ELECTRICAL EQUIPMENT CASE ARRANGING STRUCTURE

(75) Inventors: Masashi Bandoh, Wako (JP); Atsuhiro Naganuma, Wako (JP); Satoyoshi Oya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 10/850,062

(22) Filed: May 20, 2004

(65) Prior Publication Data

US 2004/0232672 A1   Nov. 25, 2004

(30) Foreign Application Priority Data

May 21, 2003   (JP)   ............................. 2003-143412

(51) Int. Cl.
*B60N 3/12*   (2006.01)
(52) U.S. Cl. .................. 296/37.8; 296/37.14; 180/68.5
(58) Field of Classification Search ............... 296/37.8, 296/37.14, 63, 65.01, 37.1, 37.15, 37.16; 297/115; 280/735; 429/61; 180/271, 68.5, 180/68.1; 62/239; 224/498; 307/10.1
See application file for complete search history.

(56) References Cited

U.S. PATENT DOCUMENTS

| | | | | |
|---|---|---|---|---|
| 4,453,759 A | * | 6/1984 | Kathiria | 296/37.8 |
| 4,832,241 A | * | 5/1989 | Radcliffe | 296/37.15 |
| 4,940,275 A | * | 7/1990 | Miki et al. | 296/37.8 |
| 5,338,081 A | * | 8/1994 | Young et al. | 296/37.8 |
| 5,390,976 A | * | 2/1995 | Doughty et al. | 297/115 |
| 5,392,873 A | * | 2/1995 | Masuyama et al. | 180/68.5 |
| 5,492,068 A | * | 2/1996 | McKee | 296/37.8 |
| 5,501,289 A | * | 3/1996 | Nishikawa et al. | 296/37.14 |
| 5,534,364 A | * | 7/1996 | Watanabe et al. | 429/61 |
| 5,641,031 A | * | 6/1997 | Riemer et al. | 180/68.5 |
| 5,897,155 A | * | 4/1999 | Kerner et al. | 296/37.8 |
| 5,915,777 A | * | 6/1999 | Gignac et al. | 296/37.16 |
| 5,951,084 A | * | 9/1999 | Okazaki et al. | 296/37.16 |
| 5,957,521 A | * | 9/1999 | Schlachter | 296/37.15 |
| 5,997,092 A | * | 12/1999 | Slaven | 296/37.1 |
| 6,094,927 A | * | 8/2000 | Anazawa et al. | 62/239 |
| 6,116,674 A | * | 9/2000 | Allison et al. | 296/37.8 |
| 6,188,574 B1 | * | 2/2001 | Anazawa | 180/68.5 |
| 6,189,636 B1 | * | 2/2001 | Kikukawa | 180/68.5 |
| 6,203,088 B1 | * | 3/2001 | Fernandez et al. | 296/37.8 |
| 6,315,069 B1 | * | 11/2001 | Suba et al. | 180/68.5 |
| 6,322,123 B1 | * | 11/2001 | Garrison et al. | 296/37.8 |
| 6,338,429 B1 | * | 1/2002 | Pesce | 296/37.8 |
| 6,375,247 B1 | * | 4/2002 | Volz et al. | 296/65.01 |
| 6,378,637 B1 | * | 4/2002 | Ono et al. | 180/68.5 |
| 6,394,210 B1 | * | 5/2002 | Matsuda et al. | 180/68.1 |
| 6,422,440 B1 | * | 7/2002 | Stone | 296/37.15 |

(Continued)

FOREIGN PATENT DOCUMENTS

JP            7-112620            5/1995

*Primary Examiner*—Kiran B. Patel
(74) *Attorney, Agent, or Firm*—Hamre, Schumann, Mueller & Larson, P.C.

(57) ABSTRACT

A high-voltage electrical equipment case is arranged between a driver's seat and a front passenger's seat which are placed in parallel in a transverse direction, whereby in the event that the battery which is a heavy article is accommodated in this high-voltage electrical equipment case, a necessity is obviated of disposing the battery underneath a rear seat. Moreover, the high-voltage electrical equipment case can be disposed near an air conditioner that is installed in a front part of a vehicle.

5 Claims, 5 Drawing Sheets

U.S. PATENT DOCUMENTS

| | | |
|---|---|---|
| 6,443,253 B1 * | 9/2002 | Whitehead et al. ......... 180/68.1 |
| 6,497,443 B1 * | 12/2002 | Worrell et al. ............. 296/37.8 |
| 6,541,154 B1 * | 4/2003 | Oogami et al. ............. 429/159 |
| 6,588,821 B1 * | 7/2003 | Worrell et al. ............. 296/37.8 |
| 6,662,891 B1 * | 12/2003 | Misu et al. ................ 180/68.5 |
| 6,719,343 B1 * | 4/2004 | Emerling et al. .......... 296/37.8 |
| 6,736,438 B1 * | 5/2004 | Wieclawski ................ 296/37.8 |
| 6,752,443 B1 * | 6/2004 | Thompson et al. ...... 296/37.15 |
| 6,761,388 B1 * | 7/2004 | Lein et al. ................. 296/37.8 |
| 6,811,197 B1 * | 11/2004 | Grabowski et al. ........ 296/37.8 |
| 6,837,531 B1 * | 1/2005 | Mack et al. ............. 296/37.15 |
| 6,874,667 B1 * | 4/2005 | Dykstra et al. ............. 224/498 |
| 6,902,020 B1 * | 6/2005 | Kronner et al. ............ 180/68.5 |
| 2002/0021015 A1 * | 2/2002 | Kronner et al. .......... 296/37.15 |
| 2003/0122392 A1 * | 7/2003 | Larsen et al. ............. 296/37.8 |

* cited by examiner

HIGH-VOLTAGE ELECTRICAL EQUIPMENT CASE ARRANGING STRUCTURE

BACKGROUND OF THE INVENTION

1. Field of the Invention

The present invention relates to a high-voltage electrical equipment case arranging structure.

2. Description of the Related Art

With respect to a high-voltage electrical equipment arranging structure on a vehicle body floor, there has been proposed a technique in which motor control units for controlling running motors are placed underneath a driver's seat and a front passenger's seat, respectively, and a battery for storing electric power for the running motors is provided underneath a rear seat (refer, for example, to JP-7-112620).

In the aforesaid structure where the motor control units are provided underneath the driver's seat and the front passenger's seat, respectively, and the battery is provided underneath the rear seat, since the heavy portions are dispersed when set in place, a good weight distribution can not be realized for the vehicle, and therefore, there is a ground for further improvement. Additionally, in the structure where the battery is placed underneath the rear seat, the battery so placed tends to constitute an interruption to a seat arrangement of the rear seat which is popular in particular with recreational vehicles, and hence a good seat arrangement cannot be attained.

SUMMARY OF THE INVENTION

Consequently, an object of the invention is to provide a high-voltage electrical equipment case arranging structure which can enable a good weight distribution and a good seat arrangement and which can obtain a superior product quality.

With a view to attaining the object, according to a first embodiment of the invention, there is provided a structure for arranging a high-voltage electrical equipment case (for example, a high-voltage electrical equipment case 30 in an embodiment) on a vehicle body floor (for example, a vehicle body floor 16 in the embodiment), wherein the high-voltage electrical equipment case is arranged between a driver's seat (a drivers seat 22 in the embodiment) and a front passenger's seat (for example, a front passenger's seat 23 in the embodiment) which are placed in parallel in a transverse direction.

Thus, since the high-voltage electrical equipment case is arranged between the driver's and the front passenger's seats, which are placed in parallel in the transverse direction, in the event that a battery, which is a heavy article, is accommodated in the high-voltage electrical equipment case, the necessity is obviated of arranging the battery underneath the mar seat. Moreover, the high-voltage electrical equipment case can be disposed near an air conditioner which is installed in a front part of the vehicle.

According to a second aspect of the invention, there is provided a high-voltage electrical equipment case arranging structure as set forth in the first aspect of the invention, wherein the high-voltage electrical equipment case is arranged to extend to the underneath of at least one of the driver's seat and the front passenger's seat.

Thus, since the high-voltage electrical equipment case is arranged to extend to the underneath of the driver's seat or the front passengers seat, the height of a part of the case which is located between the driver's seat and the front-passenger's seat can be maintained as low as possible.

According to a third aspect of the invention, there is provided a high-voltage electrical equipment case arranging structure as set forth in the second aspect of the invention, wherein the high-voltage electrical equipment case includes a longitudinally extending recessed portion (for example, a recessed portion 48 in the embodiment) in an upper portion thereof, and wherein a plurality of seat rails (for example, a plurality of seat rails 25 in the embodiment) is provided in such a manner as to straddle longitudinally the recessed portion.

Thus, since the plurality of seat rails is disposed in such a manner as to straddle longitudinally the recessed portion in the upper portion of the high-voltage electrical equipment case, the removal of the high-voltage electrical equipment case can be restricted due to each of the seat rails constituting an interruption thereto.

According to a fourth aspect of the invention, there is provided a high-voltage electrical equipment case arranging structure as set forth in any of the first to third aspects of the invention, wherein a battery (for example, a battery 32 in the embodiment) and an inverter (for example, an inverter 33 in the embodiment) are arranged in the high-voltage electrical equipment case at a position between the driver's seat and the front passenger's seat.

Thus, since the battery and the inverter are arranged in the high-voltage electrical equipment case at the position between the driver's seat and the front passenger's seat, in a case where direct-current power of the battery is converted into alternating-current power at the inverter for use, the battery and the inverter can be brought together, and needed wiring can be made short.

DETAILED DESCRIPTION OF THE INVENTION

An embodiment of a high-voltage electrical equipment case arranging structure according to the invention will be described below by reference to the accompanying drawings. Note that when used herein, direction indicating terms such as front, rear, left and right denote, front, rear, left and right to a forward traveling vehicle.

Figure 1:
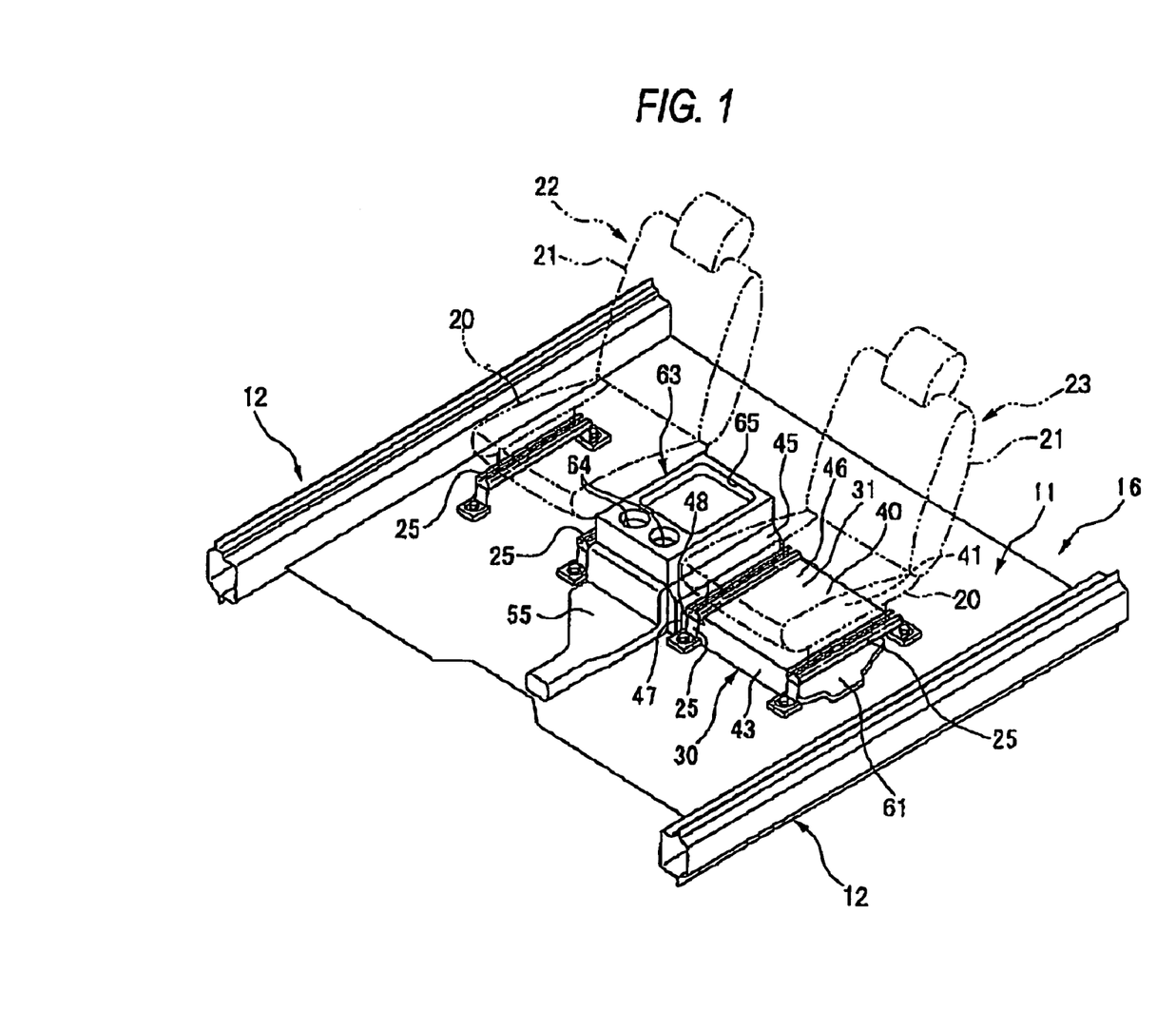
FIG. 1 is a perspective view showing a high-voltage electrical equipment case arranging structure according to an embodiment of the invention.
Figure 2:
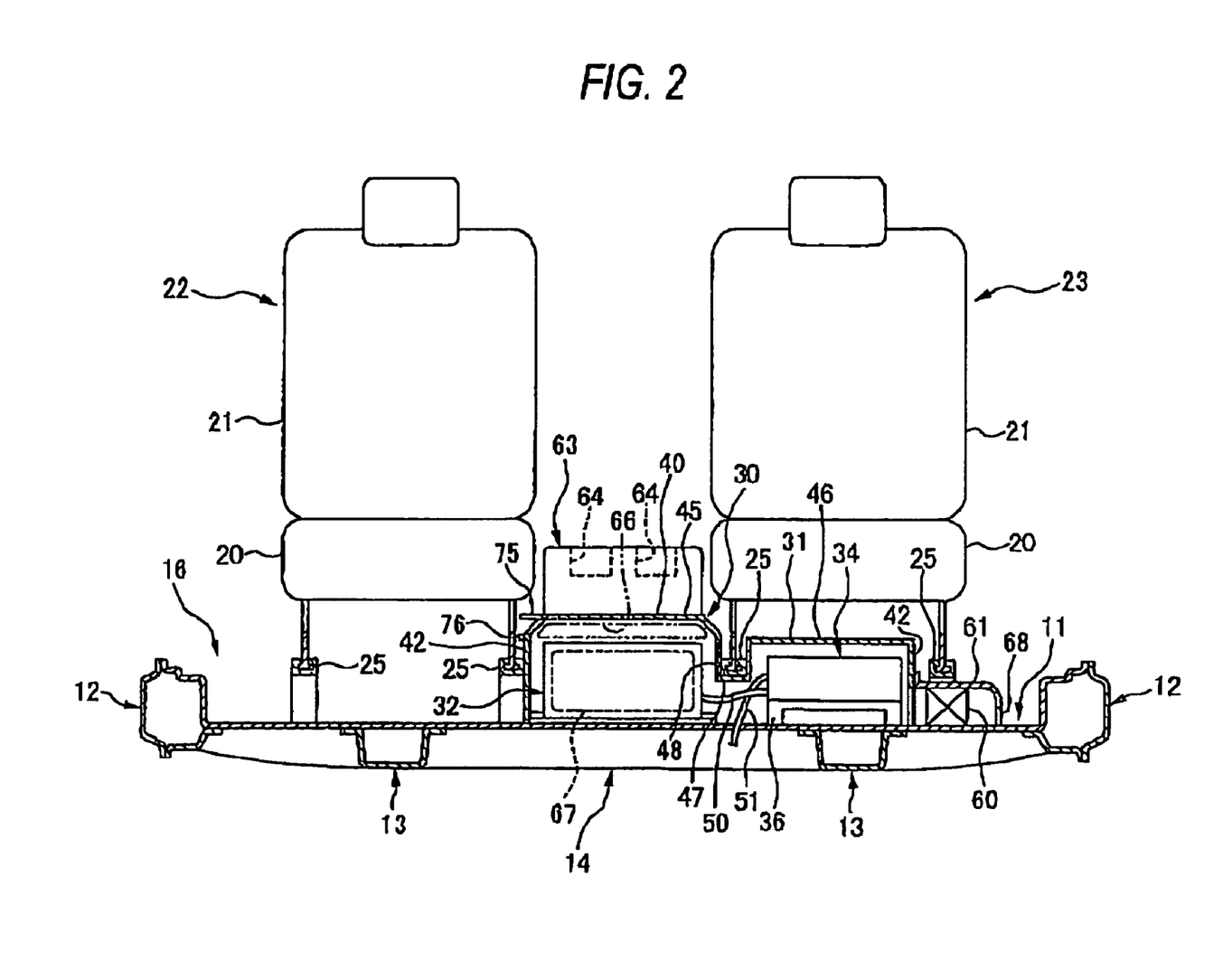
FIG. 2 is a front cross-sectional view of the high-voltage electrical equipment case arranging structure according to the embodiment of the invention.

This embodiment illustrates an example where the invention is applied to a hybrid vehicle which runs by appropriately controlling the driving force of an internal combustion engine, not shown, and the driving force of a running electric motor, also not shown, and in the drawings, reference numeral 11 denotes a floor panel of the vehicle. As shown in FIGS. 1 and 2, side sills 12 (framework portions of the vehicle body) having cross sections intersecting with the longitudinal direction at right angles are formed into a closed shape and are formed on transversely outer sides of the floor panel 11 in such a manner as to extend in the longitudinal direction.

As shown in FIG. 2, left and right side frames 13 (framework portions of the vehicle body) which are formed so as to protrude downwardly are fixed to an underside of the floor panel 11 at positions transversely inward of the side sills 12 in such a manner as to extend in the longitudinal direction of the vehicle. These side frames 13 form together with the floor 11 closed cross sections which intersect with the longitudinal direction at right angles.

Figure 5:
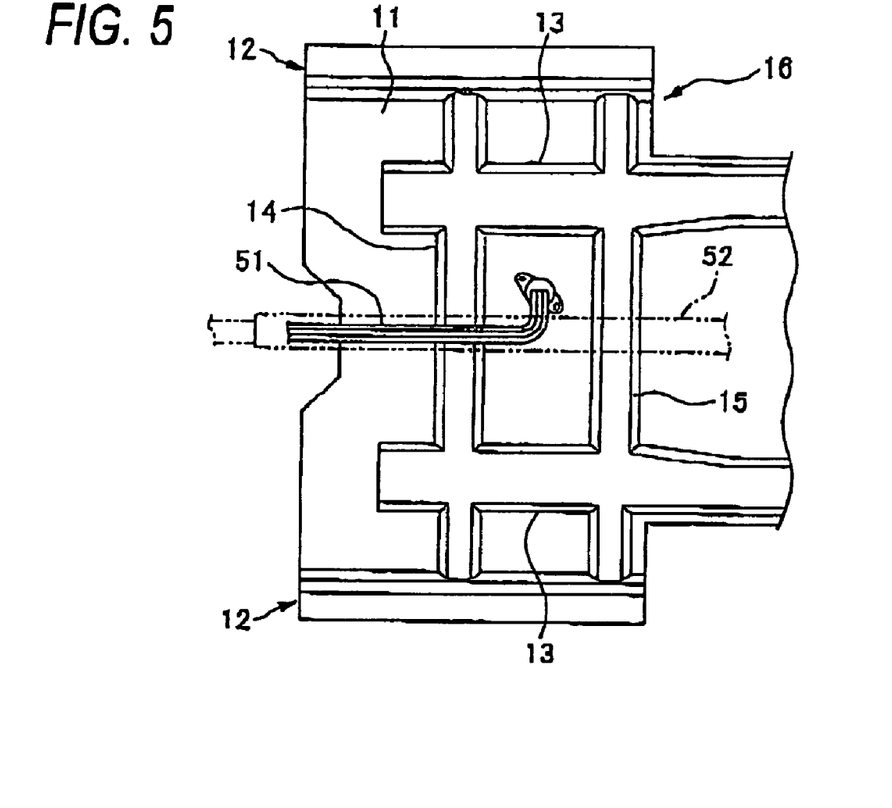
FIG. 5 is a view of a vehicle body floor in the high-voltage electrical equipment case arranging structure according to the embodiment of the invention as seen from therebelow.

A cross member (a framework member of the vehicle body) 14 which protrudes downwardly as shown in FIG. 5 is disposed on the underside of the floor panel 11 in such a manner as to intersect with both the side frames 13 and to connect to both the side sills 12 at ends thereof. Additionally, a cross member (a framework member of the vehicle body) 15 which protrudes downwardly is disposed rearward of the cross member 14 on the underside of the floor panel 11 in such a manner as to intersect with both the side frames 13 and to connect to both the side sills 12 at ends thereof. Note that a vehicle body floor 16 is constituted by the floor panel 11 and the cross members 14, 15.

Then, a driver's seat 22 and a front passenger's seat 23 which constitute a front-most row seat and which each have a seat cushion 20 which supports the hip portion of the occupant from below and a seat back which supports the back of the occupant from behind are arranged in parallel in the transverse direction above the cross members 14, 15.

In other words, front end portions and rear end portions of a pair of left and right seat rails 25 for the driver's seat are fixed to the floor panel 11, and the driver's seat 22 is supported on these seat rails 25 in such a manner as to slide in the longitudinal direction. Similarly, front end portions and rear end portions of a pair of left and right seat rails 25 fox the front passenger's seat are fixed to the floor panel 11, and the front passenger's seat 23 is supported on these seat rails 25 in such a manner as to slide in the longitudinal direction.

Then, in the embodiment, the high-voltage electrical equipment case 30 is arranged in such a manner as to extend further from between the driver's seat 22 and the front passenger's seat 23 which are disposed in parallel in the transverse direction to the underneath of the front passenger's seat 23 and is disposed in such a manner as to match the driver's seat 22 and the front passenger's seat with respect to the longitudinal position thereof.

Figure 4:
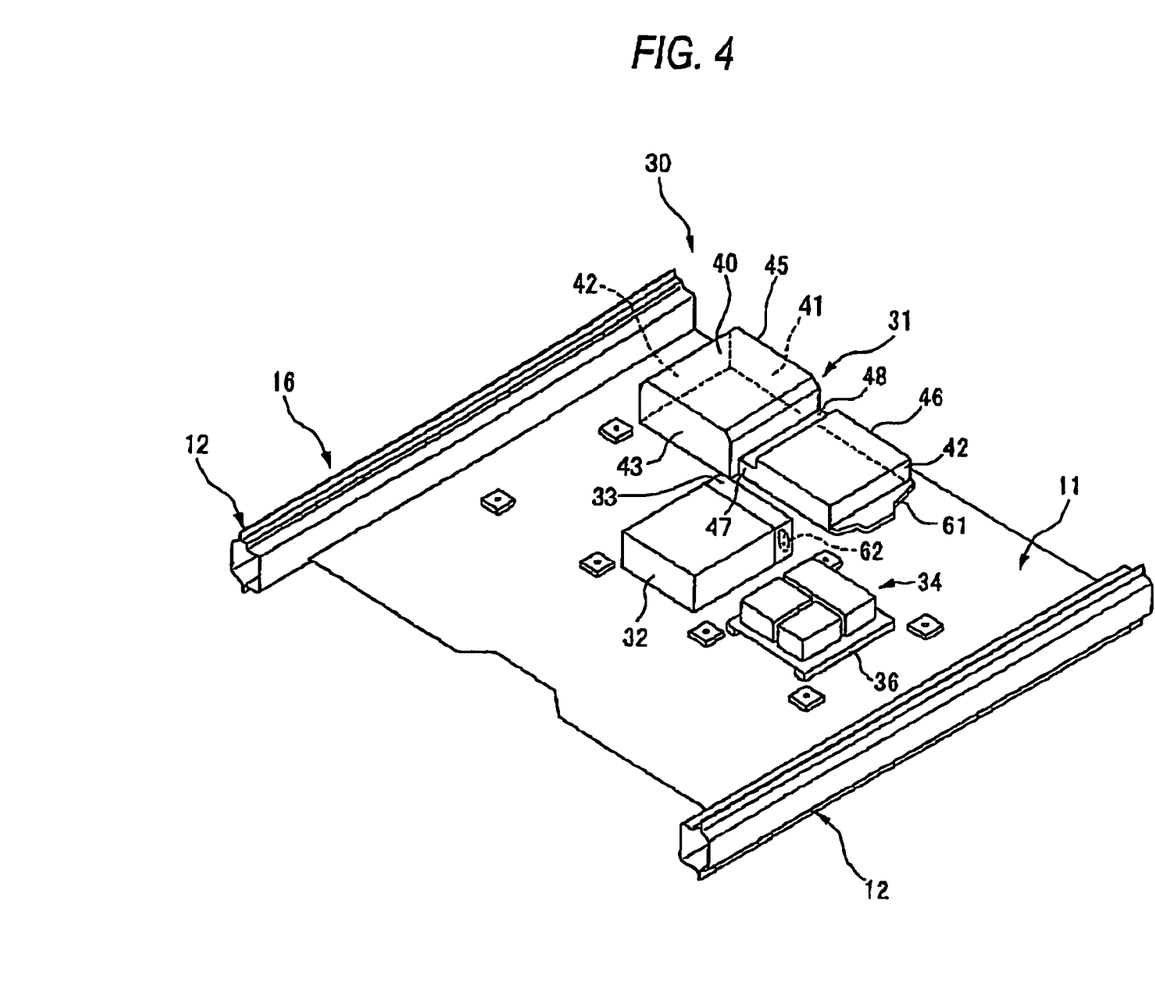
FIG. 4 is an exploded perspective view showing the high-voltage electrical equipment case arranging structure according to the embodiment of the invention.

As shown in FIG. 4, the high-voltage electrical equipment case 30 is mounted on the floor panel 11. The high-voltage electrical equipment case 30 has a case main body 31 forming an outer portion thereof, a high-voltage battery 32, an inverter 33, and a PCU (power control unit) 34. The high-voltage battery 32 is provided within the case main body 31 as a high-voltage electric part for exchanging electric power with a running electric motor, not shown. The inverter 33 is also provided within the case main body 31 as a high-voltage electrical part for converting direct-current power into alternating-current power (100V alternating current) which is the same as a commercial power supply. The PCU (power control unit) 34 is also provided within the case main body 31 as a high-voltage electrical part for controlling the operation of the running electric motor.

Figure 3:
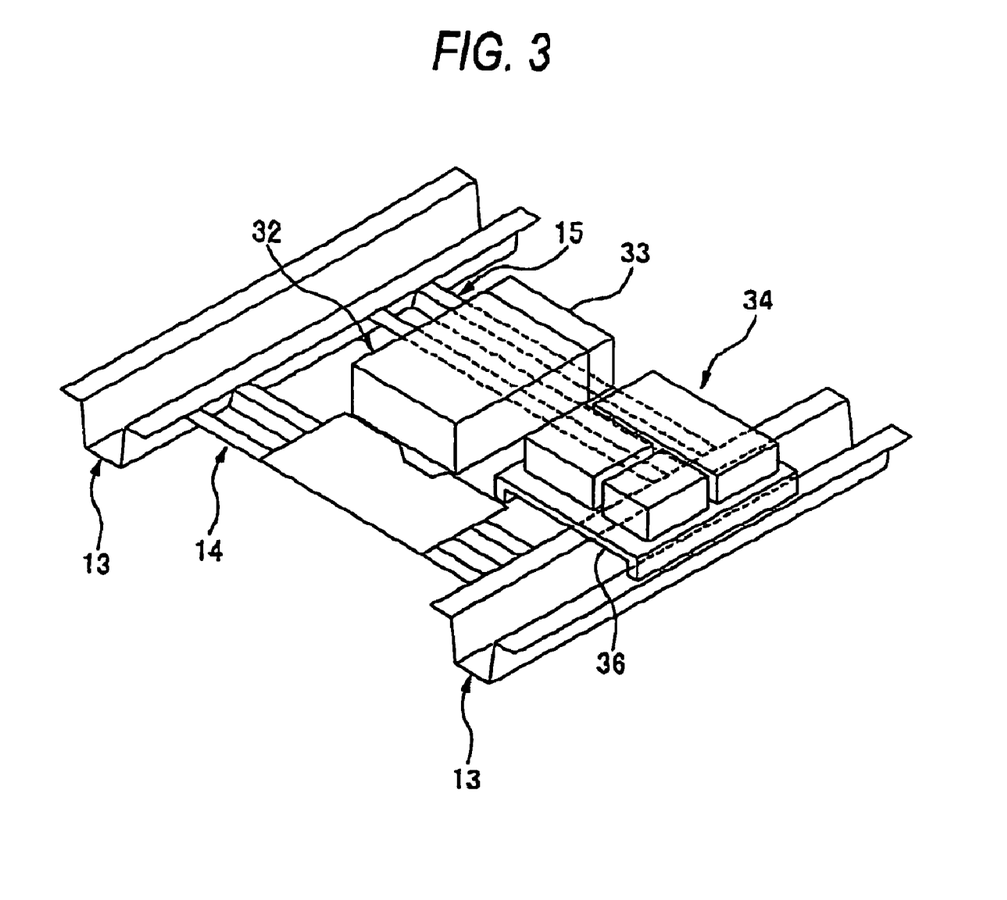
FIG. 3 is a perspective view showing an arrangement of high-voltage equipment in the high-voltage electrical equipment case arranging structure according to the embodiment of the invention.

The high-voltage battery 32, which is a heavy component, is installed between the driver's seat 22 and the front passenger's seat on the vehicle body floor 16, that is, at a substantially center of the vehicle body, and is directly fixed to the rear cross member 15 with bolts with the floor panel 11 being interposed therebetween, as shown in FIG. 3 in which the floor panel 11 is omitted. In addition, the PCU 34 is fixed to a table member 36 with bolts, and the table member 36 is fixed to the left-hand side frame 13 and the rear cross member 15 with bolts with the floor panel 11 being interposed therebetween. The inverter 33 is disposed behind the high-voltage battery 32 in such a manner as to be adjacent thereto longitudinally and is directly fixed to the rear cross member 15 with bolts with the floor panel 11 being interposed therebetween. Note that these high-voltage battery 32, inverter 33 and PCU 34 are arranged between the side frames 13 in the transverse direction.

The case main body 31 has an opening in a lower part thereof and is placed from above the high-voltage battery 32, inverter 33 and PCU 34 in such a manner as to cover them for attachment to the floor panel 11 with bolts.

As shown in FIG. 4, the case main body 31 has a top plate portion 40, a rear plate portion 41 which extends vertically downwardly from a rear end edge portion of the top plate portion 40, left and right side plate portions 42 which extend vertically downwardly from left- and right-hand side edge portions of the top plate 40 so as to be intersect with the transverse direction of the vehicle at right angles and to be parallel with each other, and a front plate portion 43 which extends vertically downwardly from a front end edge portion of the top plate portion 40.

As shown in FIG. 1, a first accommodating portion 45 is formed at a portion of the case main body 31 which is located between the driver's seat 22 and the front passenger's seat 23, and a second accommodating portion 46 is formed at a portion which is covered with the front passenger's seat 23, and as is shown in FIG. 4. Further, a portion on the case main body 31 which resides between the first accommodating portion 45 and the second accommodating portion 46 is made to be a connecting portion 47 which is lower than the first and second accommodating portions 45, 46. As a result of this, the longitudinally extending recessed portion 48 is formed on an upper side of the connecting portion 47 which is the upper part of the high-voltage electric equipment case 30.

Then, the case main body 31 is attached to the floor panel 11 in such a manner that the high-voltage battery 32 and inverter 33 are covered with the first accommodating portion 45, and the PCU 34 and table member 36 are covered with the second accommodating portion 46. Further, a high-tension cable 50 shown in FIG. 2 connecting the high-voltage battery 32 and the PCU 34 and a high-tension cable 51 extending from the PCU 34 to the running motor for driving the vehicle, which is not shown, are covered with the connecting portion 47.

Here, while the high-tension cable 51 is led from the PCU 34 to an underside of the vehicle body floor 16, here, a vehicle body for four-wheel drive vehicle is used for a front-wheel drive vehicle, and as shown in FIG. 5, the high-tension cable 51 is laid at a transverse center of the floor panel 11 which is a position where a propeller shaft 52, indicated by double-dashed lines, is disposed in a four-wheel drive vehicle.

Of the four seat rails 25, the seat rail 25 which is one of those for the front passenger's seat 23 and is located on a side facing towards the driver's scat 22 is arranged, as shown in FIGS. 1 and 2, so as to enter the longitudinally extending recessed portion 48 on the case main body 31 in such a manner as to straddle longitudinally the recessed portion 48.

Figure 6:
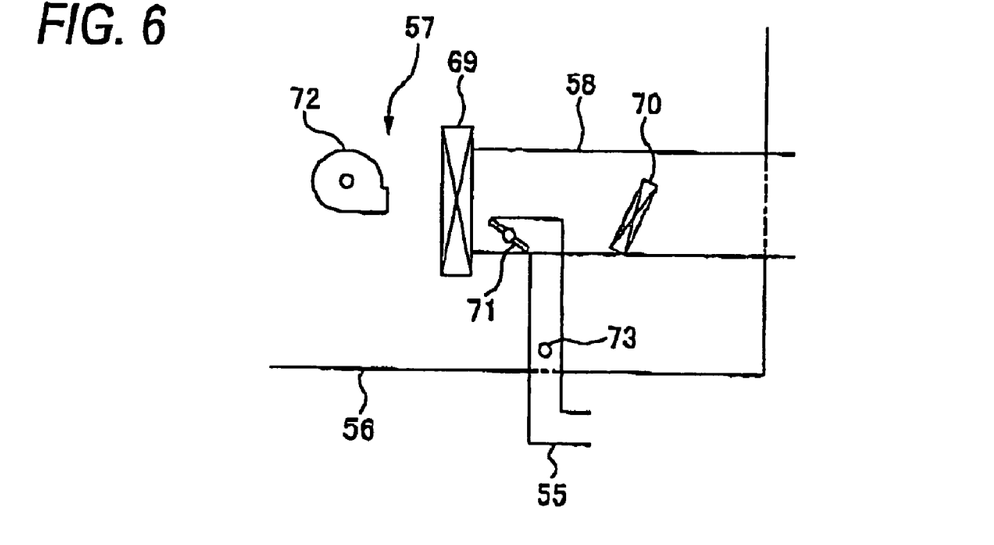
FIG. 6 is a schematic view showing a configuration related to an air conditioner in the high-voltage electrical equipment case arranging structure according to the embodiment of the invention.

As shown in FIG. 1, an induction duct 55 is attached to the front plate portion 43 of the case main body 31 at a portion matching the range of the first accommodating portion 45. This induction duct 55 extends forwards along the vehicle body floor 16 and communicates, as shown in FIG. 6 exemplary fashion, with an air conditioner duct 58 for an air conditioner 57 within an instrument panel 56. In addition, as shown in FIG. 2, a discharge duct 61 having a fan unit 60 installed therein is attached to a lower portion of the left side plate portion 42 on an outer side thereof.

An opening, not shown, is provided in the rear plate portion 41 of the case main body 31 for allowing an external power supply terminal 62 shown in FIG. 4 to be exposed towards the interior of a passenger compartment. The external power supply terminal 62 is provided at a rear portion of the inverter 33 for supplying external equipment with alternating current converted at the inverter 33.

In addition, a center console 63 is mounted on an upper portion of the first accommodating portion 45 of the case main body 31. A cup-holder portion 64 where drink containers can be placed and a small-article receiving recessed portion 65 where small articles can be placed are formed in an upper portion of the center console 63.

Here, conditioned air sent out from the air conditioner 57 shown in FIG. 6 and introduced into an upper portion inside the first accommodating portion 45 of the case main body 31 via an induction port 66 of the induction duct 55 shown in FIG. 2 moves from top to bottom in the first accommodating port ion 45, passes transversely through the interior of the connecting portion 47, passes furthermore transversely through the interior of the second accommodating portion 46 and is discharged into the interior of the passenger compartment from a discharge port 68 of the discharge duct 61. As this occurs, the conditioned air is also drawn in from the interior of the case main body 31 by means of the fan unit 60 in the discharge duct 61. Thus, the connecting portion 47 of the case main body 31 additionally functions as a connecting duct which establishes a communication between the first accommodating portion 45 and the second accommodating portion 46.

Then, when passing through the first accommodating portion 45, the conditioned air adjusts the temperatures of a battery main body 67 in the high-voltage battery 32 and the inverter 33, respectively, and also adjusts the temperature of the PCU 34 when passing through the second accommodating portion 46.

As shown in FIG. 6, the air conditioner duct 58 of the air conditioner 57 installed in the instrument panel 56 is branched off between the an evaporator 69 which is always maintained at a constant temperature in the air conditioner 57 and a heater 70, and is then allowed to communicate with the induction duct 55, and a first closing portion 71 which can be opened and closed is provided at the branched position. Namely, the first closing portion 71 is arranged to be switched between an opened state where part of conditioned air sent out by the fan 72 in the air conditioner 57 and having passed through the evaporator 69 is allowed to flow into the induction duct 55 and a closed state where no such conditioned air is allowed to flow into the induction duct 55. Note that the conditioned air that is not allowed to flow into the induction duct 55 is blown out into the passenger compartment via the air conditioner duct 58. A first temperature sensor 73 is provided within the induction duct 55.

Here, a position in the passenger compartment that is generally the lowest in terms of temperature is a position which is situated in the vicinity of the floor panel 11 between the driver's seat 22 and the front passenger's seat. As shown in FIG. 2, a second closing portion 75 that can be opened and closed is formed in a boundary portion between the top plate portion 40 and the right side plate portion 42 of the case main body 31 which is located at the lowest-temperature position. Namely, the second closing portion 75 is arranged to be switched between an opened state where air is allowed to flow between the interior of the passenger compartment and the interior of case main body 31 and a closed state where air is not allowed to flow between the interior of the passenger compartment and the interior of the case main body 31. With the second closing portion 75 being switched to the opened state and the fan unit 60 in the discharge duct 61 starting to draw in the air from the interior of the case main body 31, air is introduced from the second closing portion 75 into the first accommodating portion 45 of the case main body 31, and the air so introduced then passes through the first accommodating portion 45, the connecting portion 47 and the second accommodating portion 46 in that order and is eventually discharged from the discharge duct 61 into the passenger compartment. Then, the air adjusts the temperatures of the high-voltage battery 32 and inverter 33 when passing through the first accommodating portion 45 and adjusts the temperature of the PCU 34 when passing through the second accommodating portion 46. A second temperature sensor 76 is provided outside in the vicinity of the second closing portion 75.

Then, the closing and opening of the first closing portion 71 and the second closing portion 75 is controlled based on the temperature of the high-voltage battery 32 detected by a battery temperature sensor, not shown, and detection results of the first temperature sensor 73 and the second temperature sensor 76. Namely, the temperature of the position between the driver's seat 22 and the front passenger's seat 23 and the temperature of the conditioned air in the air conditioner 57 are compared, and air whose temperature is suitable for the high-voltage battery 32 at that time is taken into the case main body 31. The control thereof will be carried out, for example, in the following way.

In the event that the temperature of the high-voltage battery 32 is detected such that the battery temperature T is a predetermined value of, for example 20° C., the fan 60 in the discharge duct 61 is stopped. In other words, in the event that the current temperature is a temperature which is suitable for the high-voltage battery 32, no temperature adjustment is carried out.

In the event that the battery temperature T is higher than the predetermined value of, for example 20° C., the fan 60 in the discharge duct 61 is actuated. Further, the temperature T1 of an area surrounding the air conditioner 57 that is detected by the first temperature sensor 73 and the temperature T2 of an area between the driver's seat and the front passenger' seat that is detected by the second temperature sensor 76 are compared. In case of T1=T2, the second closing portion 75 situated on the second temperature sensor 76 side is closed, and the first closing portion 71 situated on the first temperature sensor 73 side is opened. In case of T1>T2, the second closing portion 75 on the second temperature sensor 76 side is opened, and the first closing portion 71 situated on the first temperature sensor 73 side is closed. In case of T1<T2, the first closing portion 71 situated on the first temperature sensor 73 side is opened, and the second closing portion 75 on the second temperature sensor 76 side is closed. In other words, when the temperature of the high-voltage battery 32 is high and cooling is needed, of airs residing in the air conditioner 57 and between the driver's seat and the front passenger's seat, air having a lower temperature is made to flow into the high-voltage electrical equipment case 30.

In the event that the battery temperature T is lower than the predetermined temperature of, for example 20° C., the fan 60 in the discharge duct 61 is driven. Further, the temperature T1 of the area surrounding the air conditioner 57 and the temperature T2 of the area between the driver's seat and the front passenger' seat are compared. In case of T1=T2, the second closing portion 75 situated on the second temperature sensor 76 side is closed, and the first closing portion 71 situated on the first temperature sensor 73 side is opened. In case of T1>T2, the first closing portion 71 situated on the first temperature sensor 73 side is opened and the second closing portion 75 on the second temperature sensor 76 side is closed. In case of T1<T2, the second closing portion 75 on the second temperature sensor 76 side is opened, and the first closing portion 71 situated on the first temperature sensor 73 side is closed. In other words, when the temperature of the high-voltage battery 32 is low and heating is needed, of the airs residing in the air conditioner 57 and between the driver's seat and the front passenger's seat, air having a higher temperature is made to flow into the high-voltage electrical equipment case 30.

Thus, as has been described heretofore, according to this embodiment, since the high-voltage electrical equipment case 30 is arranged between the driver's seat 22 and the front passenger's seat 23 which are arranged in parallel in the transverse direction and which constitute a first-row seat and the high-voltage battery 32 is accommodated in this high-voltage electrical equipment case 30, the necessity is obviated of disposing the high-voltage battery 32 underneath the rear seat such as a second-row or third-row seat. Consequently, since the weight distribution can be made better and a better seat arrangement can be realized for the rear seat such as a second-row or third-row seat, resulting in effective utilization of the passenger compartment, a superior product quality can be obtained. Furthermore, since the high-voltage electrical equipment case 30 can be arranged near the air conditioner 57 installed in the front part of the vehicle, the induction duct 55 can be made shorter, and the introduction of temperature-adjusted air into the high-voltage electrical equipment case 30 is facilitated.

In addition, since the high-voltage electrical equipment case 30 is made to extend to the underneath of the front passenger's seat 23, the height of the portion arranged between the driver's seat 22 and the front passenger's seat 23 can be maintained low. Consequently, the space inside the passenger compartment can be used effectively by, for example, arranging the center console 63 at the portion of the high-voltage electrical equipment case 30 that is arranged between the driver's seat 22 and the front passenger's seat 23.

Furthermore, since the high-voltage electrical equipment case 30 is made to extend to the underneath of the front passenger's seat 23, in the event that the high-voltage battery 32 and the PCU 34 are disposed in parallel in the high-voltage electrical equipment case 30 and the battery and the PCU are connected to each other by the high-tension cable 50, the high-tension cable 50 can also be accommodated within the high-voltage electrical equipment case 30.

In addition, since the high-voltage electrical equipment case 30 is made to extend to the underneath of the front passenger's seat 23, so that the high-voltage battery 32 and the PCU 34 are arranged in parallel within the high-voltage electrical equipment case 30, the high-voltage electrical equipment case 30 can additionally be used as a duct for adjusting the temperatures of the high-voltage battery 32 and the PCU 34, and hence the total weight and costs that are involved in the air conditioning system can be decreased. Note that the high-voltage electrical equipment case 30 may be made to extend to the underneath of the driver's seat 23, and furthermore, the high-voltage electrical equipment case 30 may be made to extend to the underneath of both the driver's seat 22 and the front passenger's seat 23.

Furthermore, since the plurality of seat rails 25 is arranged in such a manner as to straddle longitudinally the recessed portion 48 on the upper portion of the high-voltage electrical equipment case 30, an abrupt removal of the high-voltage electrical equipment case 30 can be restricted due to each of the seat rails 25 constituting an interruption thereto.

In addition, since the high-voltage 32 and inverter 33 are disposed at the position of the high-voltage electrical equipment case 30 that is situated between the driver's seat 22 and the front passenger's seat 23, in the event that direct-current power of the high-voltage battery 32 is converted to alternating-current power at the inverter 33 for use as has been described above, the battery and the inverter can be disposed so as to be brought together, and wiring needing to be laid therebetween can be made shorter. Moreover, since the external power supply terminal 62 can be disposed at the position situated between the driver's seat 22 and the front passenger's seat 23, the convenience in handling external electrical equipment can be improved.

Since the high-tension cable 51 is laid in the position where the propeller shaft 52 of a four-wheel drive vehicle would otherwise be place by using the vehicle body floor 16 of a four-wheel drive vehicle for the front-wheel drive vehicle, a needed modification to the vehicle body can be limited to a minimum level, and since the high-tension cable 51 can be laid down linearly, the length thereof can be shortened, and hence the weight of and cost for the cable can be decreased.

By fixing the high-voltage battery 32 which is a high-voltage electric part to the cross member 15 and fixing the PCU 34 which is also a high-voltage electric part to the cross member 15 via the table member 36, no new frame is required, and hence increases in cost and weight can be avoided. In addition, the modification to the vehicle body can be maintained as small as possible. By arranging the high-voltage battery 32 and the PCU 34 which are a high-voltage electric part between the left and right side frames 13, the high-voltage battery 32 and the PCU 34 can be protected by the side frames 13.

Since the temperature of the position between the driver's seat 22 and the front passenger's seat that is the lowest position within the passenger compartment in terms of temperature and the temperature of the conditioned air in the air conditioner 57 are compared so that air having a temperature that is suitable for the battery at any particular time is taken into the case main body 31 of the high-voltage electrical equipment case 30, the high-voltage battery 32 can be used with good efficiency, and the fuel consumption can be reduced.

Thus, as has been described heretofore, according to the first aspect of the invention, since the high-voltage electrical equipment case is arranged between the driver's seat and the front passenger's seat which are arranged in parallel in the transverse direction, in the event that the battery which is a heavy article is accommodated in this high-voltage electrical equipment case, the necessity is obviated of disposing the high-voltage battery underneath the rear seat such. Consequently, since the weight distribution can be made better and a better seat arrangement can be realized, resulting in effective utilization of the passenger compartment, a superior product quality can be obtained. Furthermore, since the high-voltage electrical equipment case can be arranged near the air conditioner installed in the front part of the vehicle, the introduction of temperature-adjusted air into the high-voltage electrical equipment case is facilitated.

According to the second aspect of the invention, since the high-voltage electrical equipment case is made to extend to the underneath of the driver's seat or the front passenger's seat, the height of the portion arranged between the driver's seat and the front passenger's seat can be maintained low. Consequently, the space inside the passenger compartment can be used effectively by, for example, arranging the center console at the portion of the high-voltage electrical equipment case that is arranged between the driver's seat and the front passenger's seat.

According to the third aspect of the invention, since the plurality of seat rails is arranged in such a manner as to straddle longitudinally the recessed portion on the upper portion of the high-voltage electrical equipment case, the removal of the high-voltage electrical equipment case can be restricted due to each of the seat rails constituting an interruption thereto.

In addition, since the high-voltage and inverter are disposed at the position of the high-voltage electrical equipment case that is situated between the driver's seat and the front passenger's seat, in the event that direct-current power of the battery is converted to alternating-current power at the inverter for use, the battery and the inverter can be disposed so as to be brought together, and wiring needing to be laid therebetween can be made shorter. Moreover, in the event that the external power supply terminal is disposed as an additional part to the inverter, the convenience in handling external electrical equipment can be increased very much.

What is claimed is:

1. A structure, comprising a high-voltage electrical equipment case on an interior side of a vehicle body floor, wherein
   the high-voltage electrical equipment case is arranged between a driver's seat and a front passenger's seat which are placed in parallel in a traverse direction,
   the high-voltage electrical equipment case is arranged to extend to the underneath of at least one of the driver's seat and the front passenger's seat, and
   a plurality of seat rails are provided longitudinally straddling the high-voltage electrical equipment case.

2. A high-voltage electrical equipment case arranging structure as set forth in claim 1, wherein the high-voltage electrical equipment case includes a longitudinally extending recessed portion in an upper portion thereof, and wherein a seat rail is provided in such a manner as to straddle longitudinally the recessed portion.

3. A high-voltage electrical equipment case arranging structure as set forth in claim 1, wherein a battery and an inverter are arranged in the high-voltage electrical case at a position between the driver's seat and the front passenger's seat.

4. A high-voltage electrical equipment case arranging structure as set forth in claim 1, wherein a battery and an inverter are arranged in the high-voltage electrical equipment case at a position between the driver's seat and the front passenger's seat.

5. A high-voltage electrical equipment case arranging structure as set forth in claim 2, wherein a battery and an inverter are arranged in the high-voltage electrical equipment case at a position between the driver's seat and the front passenger's seat.

* * * * *